(12) United States Patent
Denton et al.

(10) Patent No.: US 7,689,592 B2
(45) Date of Patent: Mar. 30, 2010

(54) METHOD, SYSTEM AND PROGRAM PRODUCT FOR DETERMINING OBJECTIVE FUNCTION COEFFICIENTS OF A MATHEMATICAL PROGRAMMING MODEL

(75) Inventors: Brian T. Denton, Rochester, MN (US); Robert John Milne, Jericho, VT (US); Rahul Nahar, South Burlington, VT (US); Mark Gregory Pleszkoch, Lynchburg, VA (US); Vivek Sharma, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/203,603

(22) Filed: Aug. 11, 2005

(65) Prior Publication Data

US 2007/0038657 A1    Feb. 15, 2007

(51) Int. Cl.
G06F 7/00 (2006.01)
G06F 17/00 (2006.01)

(52) U.S. Cl. .............................. 707/104.1; 703/2; 703/3

(58) Field of Classification Search ........................ None
See application file for complete search history.

(56) References Cited

U.S. PATENT DOCUMENTS 5,630,070 A * 5/1997 Dietrich et al. ................. 705/8

(Continued)

FOREIGN PATENT DOCUMENTS

JP    2001202119    7/2001

(Continued)

OTHER PUBLICATIONS

Ping-Qi Pan, A Projective Simplex Algorithm Using LU Decomposition, Department of Mathematics, Southeast University, Nanjing, P R China, Mar. 13, 2000.*

(Continued)

*Primary Examiner*—Wilson Lee
*Assistant Examiner*—Viresh R Patel
(74) *Attorney, Agent, or Firm*—Schmeiser, Olsen & Watts; John R. Pivnichny

(57) ABSTRACT

A method and system for determining a plurality of coefficients of an objective function of a mathematical programming model. Attributes of the model are identified. A first set of coefficient values determining a first solution and initially representing the plurality of coefficients is determined by employing a specified ranking of the attributes. A prevailing solution is initialized to the first solution. Additional sets of coefficient values are generated, each set determining a corresponding additional solution of the model. The additional solutions are evaluated (e.g., by the Analytic Hierarchy Process) to provide a ranking of the solutions, where the ranking is dependent upon the attributes. The ranking of the additional solutions is used to select a second solution. The prevailing solution is set to the second solution if the second solution exceeds a sum of the prevailing solution and a specified tolerance.

20 Claims, 5 Drawing Sheets

U.S. PATENT DOCUMENTS

| | | | |
|---|---|---|---|
| 5,729,661 A | 3/1998 | Keeler et al. | |
| 5,758,026 A | 5/1998 | Lobbley et al. | |
| 5,781,432 A | 7/1998 | Keeler et al. | |
| 5,971,585 A | 10/1999 | Dangat et al. | |
| 6,006,192 A | 12/1999 | Cheng et al. | |
| 6,333,979 B1* | 12/2001 | Bondi et al. | 379/219 |
| 6,374,227 B1* | 4/2002 | Ye | 705/8 |
| 6,701,201 B2 | 3/2004 | Hegde et al. | |
| 6,721,714 B1* | 4/2004 | Baiada et al. | 705/7 |
| 2002/0103688 A1 | 8/2002 | Schneider | |
| 2002/0123930 A1 | 9/2002 | Boyd et al. | |
| 2002/0156663 A1* | 10/2002 | Weber et al. | 705/7 |
| 2003/0018399 A1 | 1/2003 | Havener et al. | |
| 2003/0229408 A1 | 12/2003 | Yasui et al. | |
| 2003/0236721 A1 | 12/2003 | Plumer et al. | |
| 2004/0162709 A1* | 8/2004 | Das | 703/2 |
| 2006/0117303 A1* | 6/2006 | Gizinski | 717/136 |

FOREIGN PATENT DOCUMENTS

| | | |
|---|---|---|
| JP | 2002366219 | 12/2002 |

OTHER PUBLICATIONS

O'Brien, A Decision Support System for Supplier Selection Using an Integrated Analytic Hierarchy Process and Linear Programming, 1996, Production Economics, pp. 200-212.*

Benyoun, Linear Programming with Multiple Objective Functions: Step Method (Stem), North-Holland Publishing Company, 1970, pp. 366-375.*

Thomas L. Saaty, Decision Making With the Analytic Hierarchy Process, International Journal of Information Technology, vol. 1, No. 1, 1995, pp. 33-52.

Manfred Padberg, Linear Optimization and Extensions, Springer-Verlag, Berlin, 1995, ISBN 3-540-58734-9, section 7.4, pp. 151-170.

* cited by examiner

METHOD, SYSTEM AND PROGRAM PRODUCT FOR DETERMINING OBJECTIVE FUNCTION COEFFICIENTS OF A MATHEMATICAL PROGRAMMING MODEL

BACKGROUND OF THE INVENTION

1. Technical Field

The present invention relates to a computer-implemented method and system for determining objective function coefficients of a mathematical programming model, and more particularly to a technique for determining objective function coefficients for multi-criteria evaluation of constrained large-scale production plans.

2. Related Art

A fundamental problem faced in manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products. This range of finished products is typically on the order of thousands in semiconductor manufacturing. Such advance planning depends upon the availability of finite resources which include finished goods inventory, work in process (WIP) inventory at various stages of the manufacturing system, and work-center capacity. Often, there are alternative possibilities for satisfying the demand. Products may be built at alternate locations, and within a location there may be choices as to which materials and/or capacity to use to build the product. Further, the product may be built directly or acquired through material substitution or purchase. When limited resources prevent the satisfaction of all demands, decisions need to be made as to which demands to satisfy and how to satisfy them. This resource allocation problem is often addressed by solving a linear program (LP) having some objective function coefficient inputs that are determined based on known data (e.g., product yields), and other coefficient inputs that are based on subjective judgments (e.g., inventory holding costs). A solution of such an LP is sensitive to the subjectively determined coefficients (e.g., the solution varies widely as the subjectively determined coefficients vary). Conventional techniques utilize intuition and trial-and-error guesswork to vary the subjectively based coefficients in multiple instances of the LP to generate multiple outputs, which are compared to select a final solution. The objective function coefficients associated with the final solution are not provided in a systematic, automated, and repeatable manner. Thus, there is a need for an improved technique for determining objective function coefficients.

SUMMARY OF THE INVENTION

In first embodiments, the present invention provides a method of determining a plurality of coefficients of an objective function of a mathematical programming model in a computing environment, the method comprising:

identifying a plurality of attributes of said model;

determining a first set of coefficient values as initially representing said plurality of coefficients, said first set determining a first solution of said model, wherein said determining said first set employs a specified ranking of the attributes of said plurality of attributes;

initializing a prevailing solution to said first solution;

generating one or more sets of coefficient values determining a corresponding one or more solutions of said model in addition to said prevailing solution;

evaluating said one or more solutions to provide a ranking of said one or more solutions, said ranking of said one or more solutions dependent upon said plurality of attributes, wherein said ranking of said one or more solutions is employed to select a second solution of said one or more solutions; and setting said prevailing solution to said second solution if said second solution exceeds a sum of said prevailing solution and a specified tolerance.

In second embodiments, the present invention provides a system for determining a plurality of coefficients of an objective function of a mathematical programming model in a computing environment, the system comprising:

means for identifying a plurality of attributes of said model;

means for determining a first set of coefficient values as initially representing said plurality of coefficients, said first set determining a first solution of said model, wherein said determining said first set employs a specified ranking of the attributes of said plurality of attributes;

means for initializing a prevailing solution to said first solution;

means for generating one or more sets of coefficient values determining a corresponding one or more solutions of said model in addition to said prevailing solution;

means for evaluating said one or more solutions to provide a ranking of said one or more solutions, said ranking of said one or more solutions dependent upon said plurality of attributes, wherein said ranking of said one or more solutions is employed to select a second solution of said one or more solutions; and means for setting said prevailing solution to said second solution if said second solution exceeds a sum of said prevailing solution and a specified tolerance.

In third embodiments, the present invention provides at least one program storage device readable by a machine, tangibly embodying at least one program of instructions executable by the machine to perform a method of determining a plurality of coefficients of an objective function of a mathematical programming model in a computing environment, the method comprising:

identifying a plurality of attributes of said model;

determining a first set of coefficient values as initially representing said plurality of coefficients, said first set determining a first solution of said model, wherein said determining said first set employs a specified ranking of the attributes of said plurality of attributes;

initializing a prevailing solution to said first solution;

generating one or more sets of coefficient values determining a corresponding one or more solutions of said model in addition to said prevailing solution;

evaluating said one or more solutions to provide a ranking of said one or more solutions, said ranking of said one or more solutions dependent upon said plurality of attributes, wherein said ranking of said one or more solutions is employed to select a second solution of said one or more solutions; and setting said prevailing solution to said second solution if said second solution exceeds a sum of said prevailing solution and a specified tolerance.

In fourth embodiments, the present invention provides a method for deploying computing infrastructure, comprising integrating computer-readable code into a computing system, wherein the code in combination with the computing system is capable of performing a process of determining a plurality of coefficients of an objective function of a mathematical programming model in a computing environment, the process comprising:

identifying a plurality of attributes of said model;

determining a first set of coefficient values as initially representing said plurality of coefficients, said first set determining a first solution of said model, wherein said determining said first set employs a specified ranking of the attributes of said plurality of attributes;

initializing a prevailing solution to said first solution;

generating one or more sets of coefficient values determining a corresponding one or more solutions of said model in addition to said prevailing solution;

evaluating said one or more solutions to provide a ranking of said one or more solutions, said ranking of said one or more solutions dependent upon said plurality of attributes, wherein said ranking of said one or more solutions is employed to select a second solution of said one or more solutions; and setting said prevailing solution to said second solution if said second solution exceeds a sum of said prevailing solution and a specified tolerance.

Advantageously, the present invention provides a method of determining objective function coefficients of an optimal solution of a mathematical programming model in successive refinements, where the successive refinements are automated, logical, systematic, and repeatable. Further, the present invention searches through a large range of potential solutions for an optimal solution of the model, rather than being restricted to mapping predetermined model inputs to corresponding model outputs.

DETAILED DESCRIPTION OF THE INVENTION

The present invention determines coefficients of an objective function for a mathematical programming model (e.g., linear program or LP). These coefficients are determined by considering a series of different scenarios, each scenario testing a different instance of the model with different objective function coefficients. As used herein, a scenario is defined as a set of candidate values for the objective function coefficients. The different scenarios are generated and compared iteratively, and a search space for the objective function coefficients is successively refined during each iteration. The objective function coefficients determined by this process are optimized based on attributes that are associated with the model. In one example, the model optimizes large-scale production planning for a complete supply chain, which can include multiple manufacturing plants, interplant shipments, and multiple distribution centers.

As used herein, a mathematical programming model is defined as an optimization problem in which an objective function of multiple variables is maximized or minimized, subject to constraints on the variables. An objective function is a function that specifies an objective or goal of the optimization problem. Determining objective function coefficients is defined as determining a value of each of the coefficients. The successive refinement of the objective function coefficients is referred to herein as a calibration, and the overall process of determining objective function coefficients in the present invention is referred to herein as a calibration process. Details of the calibration process are discussed below relative to FIG. 1.

Linear Programming Model for the Calibration Process

Figure 1:
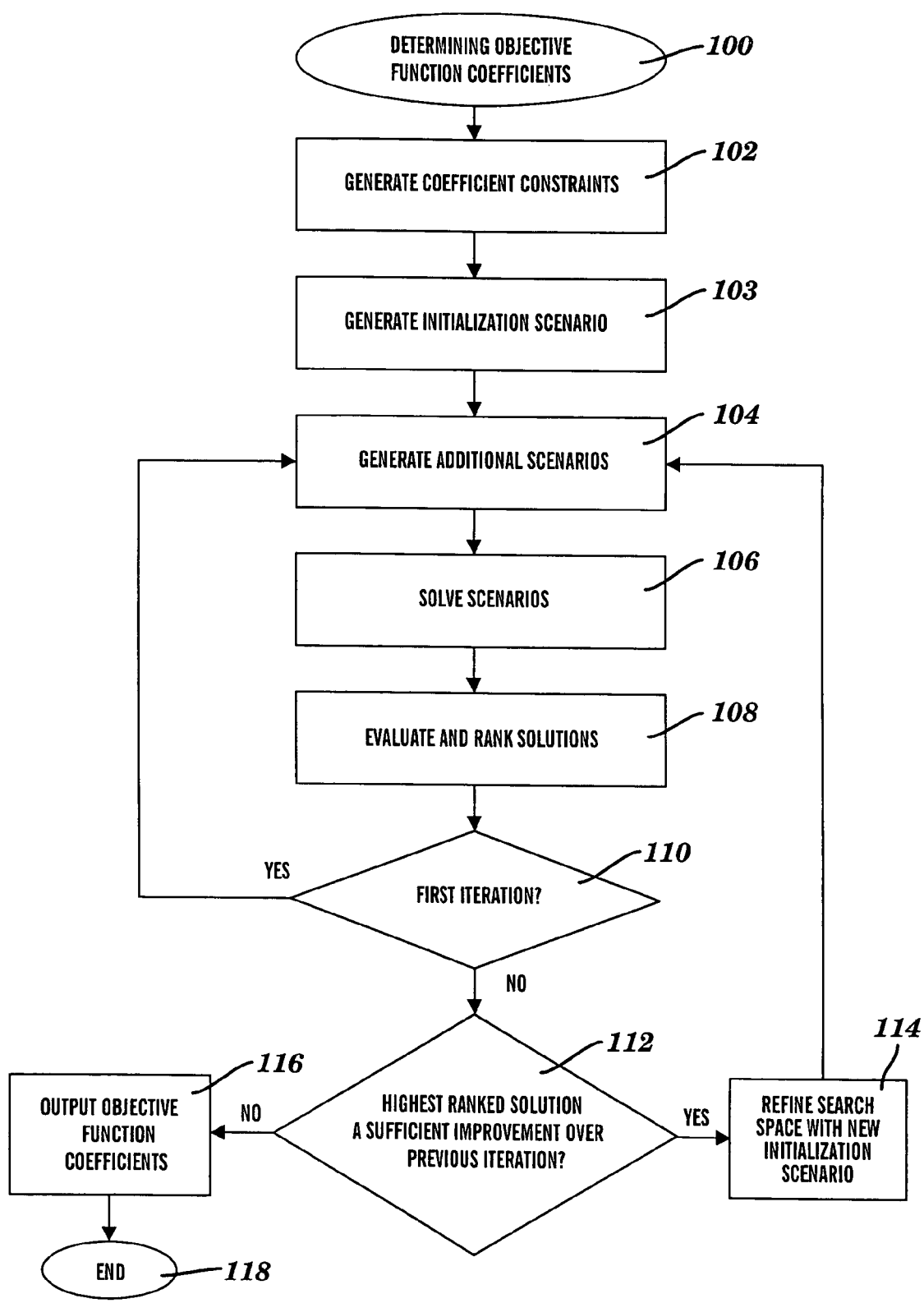
FIG. 1 is a flow chart of logic for determining objective function coefficients, in accordance with embodiments of the present invention.

FIG. 1 is a flow chart of logic for determining objective function coefficients, in accordance with embodiments of the present invention. In one embodiment, the objective function coefficients being determined are associated with an LP. FIG. 1 is described relative to a sample production planning LP for optimizing production costs. Examples of constraints used in a production planning LP and a complete sample LP formulation are included respectively in the Definitions and LP Formulation sections presented below. Hereinafter, a reference to a specific linear program refers to the LP formulation in the LP Formulation section presented below.

The production planning LP presented herein is associated with the logic of the present invention for illustrative purposes, and it will be apparent to those skilled in the art that the logic can be associated with other mathematical programming models (e.g., a nonlinear programming model), and be utilized in other contexts instead of production planning (e.g., distribution planning, manufacturing scheduling, capacity planning, and financial modeling).

The example LP's objective function coefficients that are to be calibrated by the logic of FIG. 1 include:

$PRC_{jmae}$: cost of releasing one piece of part m during period j at plant a using process e (i.e., processing cost)

$SUBC_{jmna}$: substitution cost per piece of part number n which is being substituted by part number m during period j at plant a $TC_{jmav}$: transportation cost per piece of part number m leaving plant a during period j which are destined for plant v (i.e., shipping cost)

$NVC_{jma}$: inventory cost of holding one piece of part number m at the end of period j at a particular plant a $DMAXC_{jzau}$: cost per piece of exceeding the maximum amount of shipments of group z parts from plant a to consuming location(s) u during period j $DMINC_{jzau}$: cost per piece of falling short of the minimum amount of shipments specified for group z parts from plant a to consuming location(s) u during period j $BOC_{jmkq}$: backorder cost of one piece of part m at the end of period j for class q demand at customer location k The objective function coefficients of the LP each have many dependencies, as indicated above by the several subscripts associated therewith. Further, one or more of the LP objective function coefficient values are not associated with objective data.

Coefficient Constraints

Figure 2:
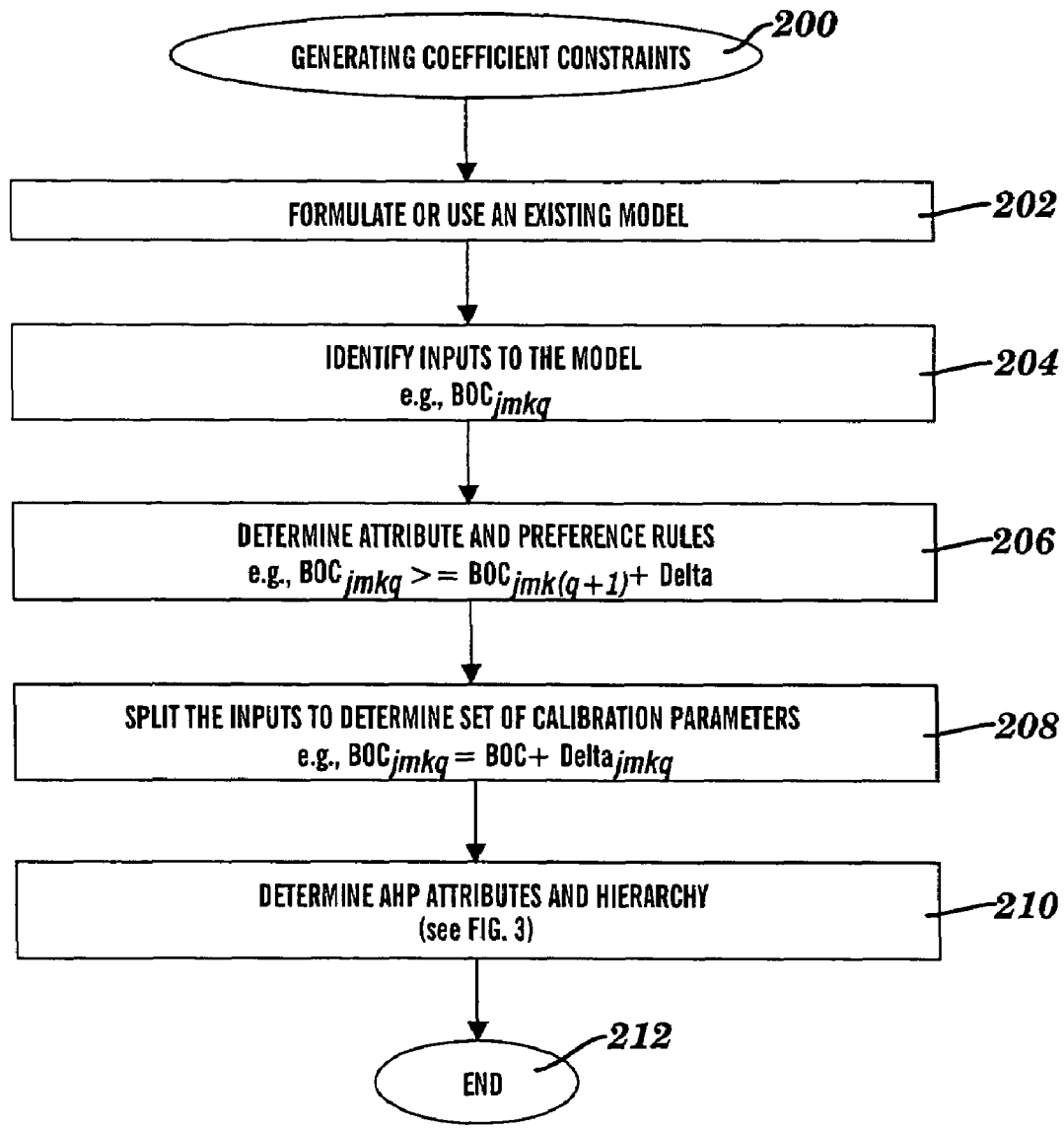
FIG. 2 is a flow chart of detailed logic for the step of generating coefficient constraints in FIG. 1, in accordance with embodiments of the present invention.

The logic of the determination of objective function coefficients begins at step 100, and in step 102, constraints associated with the objective function coefficients are generated. FIG. 2 is a flow chart of detailed logic for the step of generating coefficient constraints in step 102 of FIG. 1, in accordance with embodiments of the present invention. The generation of coefficient constraints begins at step 200, and in step 202, an existing model is used for the LP or an LP is formulated, such as the LP presented below in the LP Formulation section. In step 204, a list of determined inputs to the LP model is identified. These determined inputs are objective function coefficients whose values are determined by the method of FIG. 1. For example, one determined input is $BOC_{jmkq}$. Although the examples provided herein address determined objective function coefficients, the present invention also contemplates LP models that include one or more predetermined objective function coefficients and one or more coefficients whose values are determined by objective data. Such predetermined objective function coefficients are provided as input to the method described herein and remain constant during the method.

In step 206, two sets of logical rules (i.e., preference rules and attribute rules) describing constraints on the objective function coefficients are determined. Preference rules define relative differences between objective function coefficients of the same type, while attribute rules define relative weighting among different types of objective function coefficients. Preference and attribute rules are described in more detail in the following two sections.

Preference Rules

Preference rules are determined by stated preferences of stakeholders who have an interest in the solution of the LP. In the following examples, preference rules are defined in the context of the supply chain optimization model. Preference rules define whether one objective coefficient of a given type is larger or smaller than another objective function coefficient of the same type. For instance, when considering the objective function coefficient of inventory holding cost, inventory items with a higher monetary value (e.g. finished products) are expected to have a higher inventory holding cost than inventory items with lower monetary value (e.g., raw materials). An example of a preference rule is:

$INVC_{jma} >= INVC_{jna} + \text{Delta1}$ where m represents an assembled product (e.g., finished product) and n represents its component, subcomponent, or component of subcomponent, etc. (e.g., raw material).

Other examples of preference rules include:
a) $PRC_{jmae} >= PRC_{(j+1)mae} + \text{Delta2}$ (indicating a preference to release material later, rather than sooner);
b) $BOC_{jmkq} >= BOC_{jmk(q+1)} + \text{Delta3}$ (indicating a preference to backorder less important demand classes prior to more important ones); and
c) $TC_{jmav} >= TC_{9j+1)mav} + \text{Delta4}$ (indicating the preference to ship later, rather than sooner), where Delta1, Delta2, etc. are user-defined parameters that have sufficient magnitude to allow the associated preference to be recognized by a solver tool being used to solve the LP (e.g., a commercial LP solver such as CPLEX).

There may also be preference rules which define feasible objective function coefficient values. For instance, preference rules can be determined that specify maximum and minimum allowable values for variables based on finite computer precision. Further, preference rules can also be used to exclude unreasonable objective function coefficient values (e.g., negative backorder cost coefficients which would indicate a preference for not satisfying customer demand).

Attribute Rules Attribute rules define the relative importance of types of objective function coefficients, and are used to define relative differences between values of objective function coefficients. In the context of the supply chain optimization model, examples of attribute rules are:

$BOC_{jmkq} > PRC_{jmae} > TC_{jmav} > SUBC_{jmna} > INVC_{jma} > DMAXC_{jzau} > DMINC_{jzau}$ where, in this example, backordering cost is more important than processing cost, processing cost is more important than shipping cost, and so on. Attribute rules are determined by, for example, stakeholders who are interested in the solution of the LP.

Furthermore, there are also attribute rules which must be satisfied to guarantee appropriate behavior of the LP model. For instance, the backorder cost for a particular part, in a certain period, must be greater than the total cost of processing all subassemblies, components etc., and the total cost of shipping parts throughout the supply chain. Otherwise, the model would behave as if it were beneficial to backorder against demand.

Separating Objective Function Coefficients

The calibration process of the present invention utilizes a representation of each of the objective function coefficients by two terms: (a) a first term indicating a relative weighting compared to other types of objective function coefficients (e.g. inventory holding vs. backordering) and (b) a second term defining a relative difference between objective function coefficients of the same type (e.g. backorder coefficients for one demand class vs. another demand class). The first term is based on attribute rules and the second term is based on preference rules.

In step 208, determined inputs (i.e., objective function coefficients) identified in step 204 are each separated into preference rule and attribute rule based portions to determine a set of calibration parameters. Examples of objective function coefficients separated into preference and attribute rule based portions include:

$PRC_{jmae} = PRC + \text{Delta}_{jmae}$ $SUBC_{jmna} = SUBC + \text{Delta}_{jmna}$ $TC_{jmav} = TC + \text{Delta}_{jmav}$ $INVC_{jma} = INVC + \text{Delta}_{jma}$ $DMAX_{jzau} = DMAX + \text{Delta}_{jzau}$ $DMIN_{jzau} = DMIN + \text{Delta}_{jzau}$ $BOC_{jmkq} = BOC + \text{Delta}_{jmkq}$ where the set {PRC, SUBC, TC, INVC, DMAX, DMIN, BOC} is a set of attribute rule dependent parameters that are evaluated, for example, by the Analytic Hierarchy Process (AHP), and the Delta parameters are determined by the user-defined preference rules. The AHP is described in detail below. The Delta parameters are taken as inputs unchanged by the invention while the attribute rule dependent parameters are to be calculated by the calibration method of the present invention. Hereinafter, attribute rule dependent parameters are also referred to as attribute dependent parameters. In one embodiment, the number of parameters in the set of attribute dependent parameters is selected to be a minimal number sufficient to provide a solution to the optimization problem of the LP.

AHP Hierarchy

The Analytic Hierarchy Process or AHP is a multi-criteria decision-making framework that addresses measurements of attributes, where each measurement is based on objective data or on user preferences. The AHP methodology is described in Thomas L. Saaty, "Decision Making with the Analytic Hierarchy Process", *International Journal of Information Technology*, Vol. 1, No. 1, 1995, pp. 33-52. The present invention's novel application of the AHP in the calibration process of FIG. 1 is described below.

In step 210, AHP attributes and an AHP hierarchy of the attributes are determined. The AHP attributes are decision-making attributes to be used as selection criteria for evaluating and ranking candidate LP solutions, as described below. In a supply chain optimization context, decision-making attributes include, for example, total number of unsatisfied orders, total number of late orders, average number of days material sits in stock, and workload balance across multiple plants in the enterprise. The decision-making attributes are further described below relative to FIG. 3 and the evaluation and ranking of solutions is described below relative to step 108 of FIG. 1.

Figure 3:
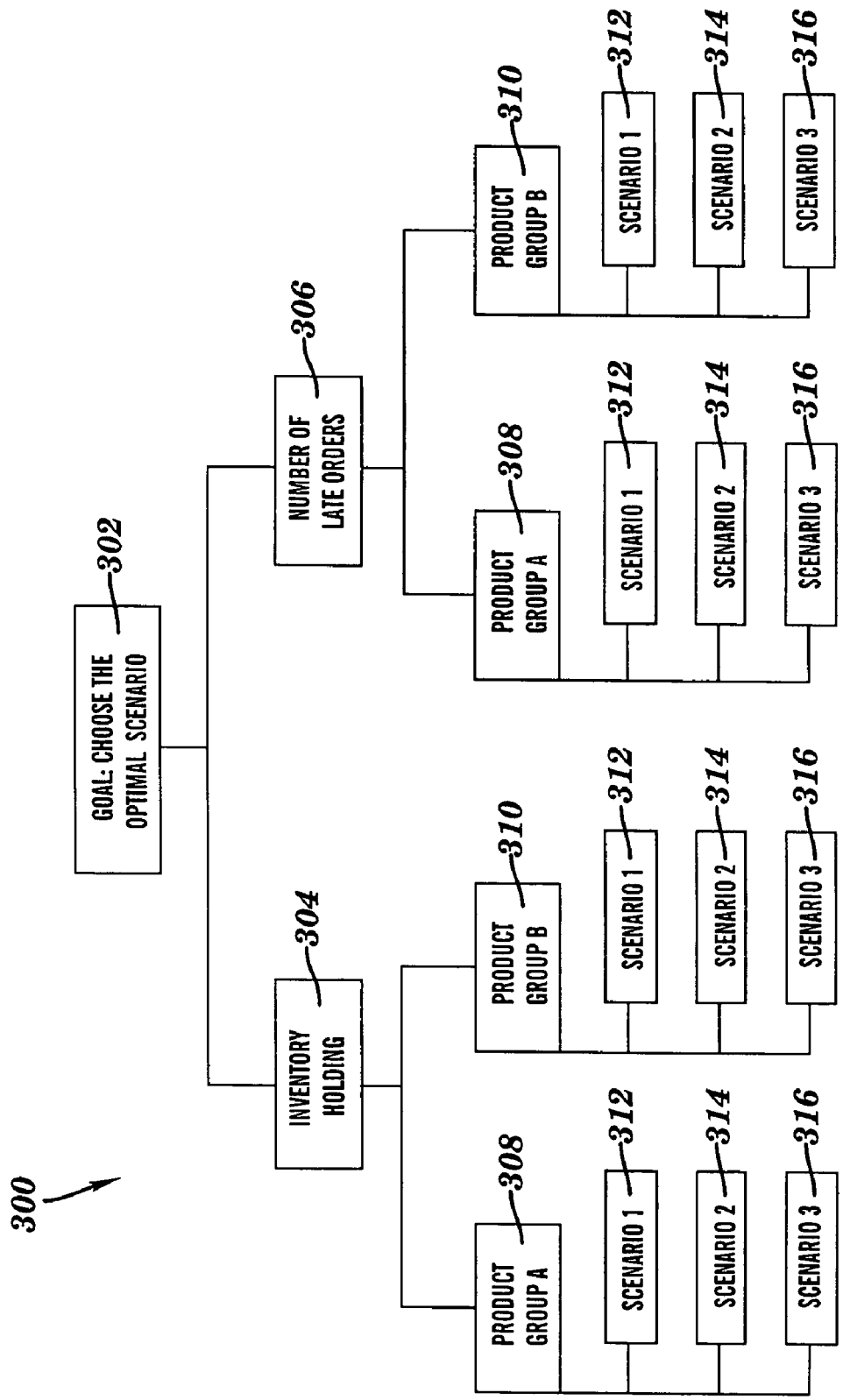
FIG. 3 is a block diagram of a hierarchical structure employed by the Analytic Hierarchy Process utilized in the logic of FIGS. 1 and 2, in accordance with embodiments of the present invention.

FIG. 3 is a block diagram of an example of an AHP hierarchy determined in step 210 of FIG. 2. On the first (or top) level of hierarchy 300 is the overall goal 302 of choosing the best scenario (i.e., determining the set of objective function coefficients associated with an optimal solution of the LP that is most preferred by the user). On the second level of hierarchy 300 are decision-making attributes (or factors or criteria) 304, 306 that contribute to goal 302. As used herein, decision-making attributes are criteria that are to be used in pair-wise comparisons to facilitate ranking solutions of the LP via the decision-making framework provided by the AHP. Decision-making attributes are determined by one or more stakeholders (i.e., one or more parties interested in the outcome of the model), and are also referred to herein as stakeholder-defined attributes. In the production planning example depicted in FIG. 3, the second level attributes are based on inventory holding 304 and the number of late orders 306.

On the third level of hierarchy 300 are product groupings A and B 308, 310, which are also known as part number groupings. Part numbers are also indicated by certain subscripts of objective function coefficients defined above. Product groupings 308, 310 can be compared in terms of attributes 304, 306 in the second level. That is, product groupings 308, 310 are pair-wise compared in terms of inventory holding 304 in a first comparison, and are also pair-wise compared in terms of the number of late orders 306 in a second comparison.

On the fourth (or bottom) level of hierarchy 300 are three scenarios 312, 314, 316 (i.e., three candidate sets of objective function coefficients associated with specific production plans), that can be compared in terms of attributes 308, 310.

For each level of hierarchy 300 (except for top level), the elements (i.e., the attributes and the scenarios of the hierarchy) of each level are pair-wise compared according to the AHP methodology to determine which element is more important in terms of the associated attribute or goal on the next higher level, and to determine how much more important that element is with respect to the associated attribute or goal on the next higher level. The order and degree of importance of the elements in pair-wise comparisons are determined by, for example, indicated preferences of one or more stakeholders. The pair-wise comparisons generate relative weights (e.g., numerical values) of the attributes and scenarios of hierarchy 300, including relative weights of attributes 304 and 306, attributes 308 and 310, and the scenarios 312, 314, 316, where each attribute and each scenario is associated with a weight. The weights associated with the scenarios are independent of the value of the objective function of the LP being solved, and indicate the relative importance that stakeholders assign to each of the scenarios.

These pair-wise comparisons are utilized to facilitate the evaluation and ranking of scenarios 312, 314, 316 via the methodology of the AHP, which also provides an evaluation and ranking of the LP solutions associated with the scenarios, and a ranking of the sets of objective function coefficients associated with each solution. This evaluation and ranking of LP solutions is a novel application of the AHP. Again, details of the methodology of the AHP are provided in the Saaty publication cited above.

Iterative Process for Calibration

Returning to FIG. 2, after the AHP attributes and AHP hierarchy are determined, the coefficient constraint determination process ends in step 212. After the process of FIG. 2 is completed, the method of FIG. 1 continues with step 103, in which an initialization scenario is generated. The initialization scenario is a scenario comprising initial tentative values of the objective function coefficients (i.e., an initial prevailing solution of the LP model). These initial objective function coefficients can be manually determined by, for example, a user of a computer system implementing the logic of FIG. 1. The manual process would involve intuition and trial-and-error calibration of the objective function to obtain an initial starting point based on the user's knowledge of the attributes and their perceived relative importance.

In step 104, multiple scenarios satisfying the preference and attribute rules are generated using the initialization scenario as a base. Each scenario is designed to test a unique set of objective function coefficient values for the LP model. Since the calibration process of FIG. 1 includes successive iterations (described below) that repeat steps starting at step 104, the term "initialization scenario" in step 104 and subsequent steps refers to an initialization scenario associated with the current iteration. In the first iteration, the initialization scenario of step 104 is generated in step 103. In iterations subsequent to the first iteration, the initialization scenario of step 104 is generated in step 114, as described below.

To generate the set of scenarios in step 104, repeated sampling associated with each of the attribute dependent parameters is performed, with the sample space being limited by the constraints generated in step 102. The sampling is based on a sample space comprising, for instance, intervals that each include one of the attribute dependent parameters of the initialization scenario, where the number of intervals equals the number of objective function coefficients of the LP, and where the boundaries of the intervals are selected to conform with the constraints determined in step 102.

For example, if there are three attribute dependent parameters in the initialization scenario (i.e., A1, A2, A3, in decreasing order of their importance based on the attribute rules), three intervals are sampled, where each interval corresponds to one of the attribute dependent parameters. In this example, sampling begins in the first interval, which is upper bounded by a maximum allowable value (e.g., based on the precision of the computer system implementing the logic of FIG. 1, or a user-specified upper bound) and lower bounded by the value of A2 (i.e., the attribute dependent parameter whose importance is closest to and less important than A1). Sampling similarly continues in the second interval bounded by A1 and A3, and the third interval bounded by A2 and a minimum allowable value (e.g., based on the precision of the computer system implementing the logic of FIG. 1, or a user-specified lower bound).

As one specific example of sampling the three intervals described above, the first and second intervals are each sampled twice, so that two attribute dependent parameter values are determined for each of the first and second intervals, and the third interval is sampled three times to determine three attribute dependent parameter values for that interval. By selecting one sampling-generated parameter value from each interval, the parameter values are combined in different ways to generate various scenarios. That is, each combination of parameter values corresponds to a set of objective function coefficients, which in turn, corresponds to a specific scenario. In this specific example, at most 12 scenarios are possible based on the maximum number of combinations of the sampling-generated parameters (i.e., 2 parameters from first interval×2 parameters from second interval×3 parameters from third interval=12 combinations).

Of course, it must be emphasized that the number of samples per interval and the resulting number of combinations described above are provided merely as an example. The present invention contemplates other numbers of samples per interval, and any or all of the potential combinations determined by the samples can be selected, as long as a plurality of scenarios is generated at step 104.

Selecting the number, N, of sample scenarios generated in step 104 is a tradeoff between the computational effort to evaluate each scenario, and the value of considering a larger search space. That is, as N increases, the computational effort increases, but the search space also increases, thereby providing an LP solution which is likely to be perceived by the user as being a solution of higher quality. Further, it will be apparent to those skilled in the art that various sampling methodologies may be employed in step 104 (e.g., random sampling over a uniform distribution, biased sampling, etc.). Still further, since initial iterations in the calibration process examine a broad range of possibilities while the final iterations refine the desired area within the narrower intervals, some users will find it helpful to decrease interval sizes as the number of iterations increase.

In step 106, each of the scenarios generated in step 104 is solved via an LP solution technique. Solving a scenario of an LP is defined as solving the LP given the set of objective function coefficient values of the scenario. The solutions of the scenarios are provided by, for example, a commercial optimization software package (e.g., CPLEX).

In step 108, the AHP is applied to evaluate and rank the scenario solutions determined in step 106. As described above, the AHP utilizes a hierarchy that relates one or more levels of stakeholder-defined attributes to the scenario solutions on the bottom level of the hierarchy. Weights are assigned to the attributes and the solutions to indicate their relative importance in terms of the associated attribute on the next higher level of the hierarchy. The evaluation of step 108 utilizes the weights to generate an aggregate value (e.g., a priority value) for each of the solutions input into the AHP. The solutions are ranked according to their respective AHP-generated aggregate values. For example, if the aggregate value of a first solution is higher than the aggregate value of a second solution, then the first solution is ranked higher than the second solution. The highest ranked solution determined by the ranking of step 108 is to be utilized in step 112, as described below.

The solutions of step 106 and the ranking of the solutions in step 108 may indicate that a modification is needed in the relationships defined by the attribute rules. For example, if a solution indicates that the relative importance of $BOC_{jmkq}$ and $PRC_{jmae}$ is different from its initial determination in step 102 the attribute rules are modified to express: $PRC_{jmae} > BOC_{jmkq}$ instead of $BOC_{jmkq} > PRC_{jmae}$. This modification step is not shown in FIG. 1. As another example, the Delta values of the objective function coefficients defined above (e.g., $BOC_{jmkq}$ and $PRC_{jmae}$) can be modified in response to the finding of an infeasible solution.

If inquiry step 110 determines that the current iteration of the process of FIG. 1 is the first iteration, the process continues by repeating steps 104, 106 and 108 to generate a second set of scenarios, determine solutions for the second set, and evaluate and rank the solutions of the second set. This loop in the logic of FIG. 1 provides the two initial sets of scenario solutions to be considered (i.e., a current set from the second iteration and a previous set from the first iteration), each having a highest ranked solution to be compared with each other. If inquiry step 110 determines that the current iteration of the FIG. 1 process is not the first iteration, the process continues at inquiry step 112.

Inquiry step 112 compares the highest ranked solution of the current iteration to the highest ranked solution of the previous iteration. The comparison in step 112 is based on the value of the objective function as determined by each of the solutions being compared. If inquiry step 112 determines that the highest ranked solution of step 108 for the current iteration is a sufficient improvement over the highest ranked solution of the previous iteration, then the search space for objective function coefficients is refined in step 114, and successively refined as step 114 is repeated in subsequent iterations of the calibration process. As used herein, a first solution of a current iteration is a sufficient improvement over a second solution of a previous iteration if the second solution exceeds a sum of the first solution and a specified tolerance. Step 114 refines the search space by using the objective function coefficients of the highest ranked solution of the current iteration as a new initialization scenario for the next iteration. Further, the prevailing solution of the LP model is updated to be the highest ranked solution of the current iteration. The next iteration then begins with the refined search space as the process repeats beginning at the generation of additional scenarios at step 104. In an alternate embodiment, the sufficient improvement of step 112 can be based on an improvement of the evaluation of step 108 from the previous iteration to the current iteration.

If inquiry step 112 determines that the highest ranked solution of the current iteration of step 108 is not a sufficient improvement over the highest ranked solution of the previous iteration (i.e., the improvement is less than or equal to the specified tolerance), then the objective function coefficients of the highest ranked solution of the current iteration are output as the solution of the LP in step 116 and the process of determining the objective function coefficients ends at step 118. In another embodiment, the objective function coefficients of the highest ranked solution of the previous iteration are output as the LP solution in step 116.

In one alternate embodiment, step 114 generates a refined search space for successive iterations based on a subset of multiple scenarios whose solutions are ranked in step 108. For example, the top 10% of scenarios in terms of their step 108 rankings are used as multiple initialization scenarios in the next iteration, from which other scenarios are generated in step 104.

In another alternate embodiment, information resulting from the comparison of a subset of scenarios can be used to update constraints generated in step 102 and modify the generation of scenarios in step 104. For instance, the LP solutions in the subset are compared to identify how the solutions differ in terms of attribute dependent parameter values. As one example, a comparison of solutions A and B indicate that A and B have the same total production, but A has fewer backorder periods than B, and B has fewer substitution quantities than A. In this example, A is assumed to be the preferable solution. The conditions of this example indicate that the relative preference of BOC to SUBC (i.e. the ratio of BOC to SUBC) should increase. This preference information is used to update values associated with the attribute rules.

In still another alternate embodiment, after outputting objective function coefficients in step 116, the entire process can be repeated with a significantly different initialization scenario for the first iteration, thereby facilitating a check that the step 116 coefficients represent a global optimum, rather than a local optimum. A global optimal solution would be indicated if the repeated process provides substantially the same objective function coefficients in step 116 as the original process.

Alternate Embodiment

Figure 4:
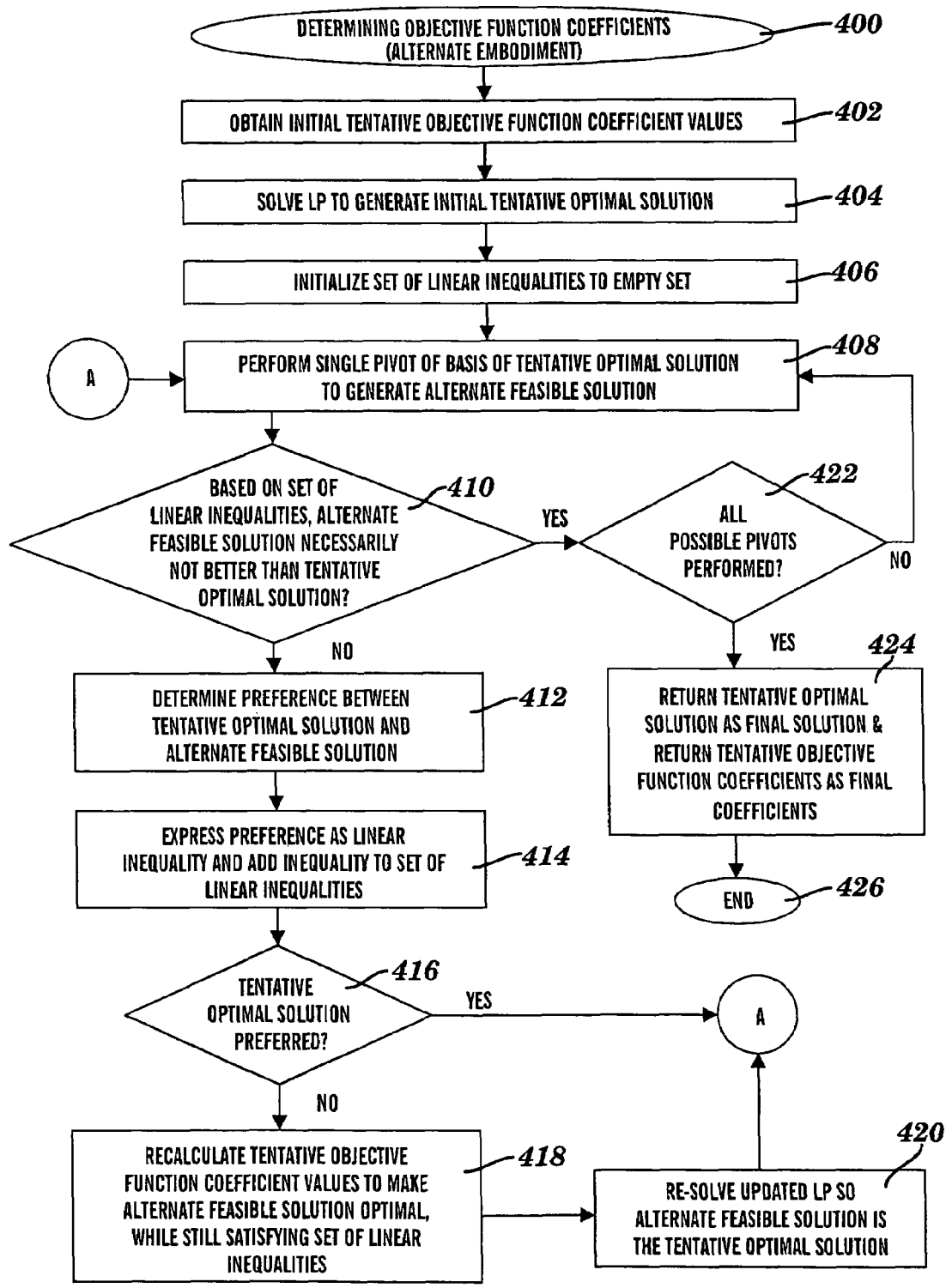
FIG. 4 is a flow chart of logic for an alternate embodiment for determining objective function coefficients, in accordance with embodiments of the present invention.

FIG. 4 is a flow chart of logic for an alternate embodiment for determining objective function coefficients, in accordance with embodiments of the present invention. Unlike the preferred embodiment discussed above relative to FIG. 1, the alternate embodiment depicted in FIG. 4 is limited to determining objective function coefficients for linear programming models, such as the LP model shown in the LP Formulation section presented below.

In the alternate embodiment, each solution preference can be represented as a linear inequality over the space of objective function coefficients. Specifically, the linear program variables are denoted by $x_i$, and the objective function coefficients are denoted by $c_i$, so that the total objective function value is $\Sigma_i c_i x_i$. With the assumption that the linear program is associated with a maximization problem, if $x_i^1$ and $x_i^2$ are two specific feasible solutions, so that $x_i^1$ and $x_i^2$ have specific numeric values, then a preference for $x_i^1$ over $x_i^2$ is represented by the following inequality:

$$\Sigma_i c_i x_i^1 > \Sigma_i c_i x_i^2 \quad (1)$$

Rearranging the terms, expression (1) becomes a linear inequality over the space of objective function coefficients $c_i$:

$$\Sigma_i (x_i^1 - x_i^2) c_i > 0 \quad (2)$$

For simplicity in processing, the linear inequality (2) can be replaced by $\Sigma_i (x_i^1 - x_i^2) c_i \geq \epsilon$ for a small enough value of $\epsilon > 0$.

When multiple solution preferences have been determined utilizing the mathematical representation described above, a set of linear inequalities is provided over the space of N objective function coefficients, which describe an N-dimensional cone in that space. Hereinafter, an N-dimensional cone is referred to simply as a cone. A minimal description of a cone can be calculated by, for example, the double description algorithm, which is described in Manfred Padberg, *Linear Optimization and Extensions*, Springer-Verlag, Berlin, 1995, section 7.4, pp. 151-170. Further, cone-related mathematical techniques can determine if an additional linear inequality is forced by/redundant with respect to a given cone by determining if the additional linear inequality is a non-negative linear combination of the minimal cone constraints, as guaranteed by the Farkas lemma.

Like the process of FIG. 1, the alternate embodiment of FIG. 4 is a calibration process that successively refines tentative solutions of the LP to determine a final solution. The calibration process of FIG. 4 includes tracking of: (1) a tentative optimal solution of the LP used as a base point to generate alternate feasible solutions of the LP; (2) a current, tentative assignment of objective function coefficient values; and (3) a set of linear inequalities over the space of objective function coefficients that represent currently determined user preferences. The tracked set of linear inequalities determines a current cone (i.e., a cone that represents the current set of linear inequalities).

After the logic of the alternate embodiment begins at 400, initial tentative objective function coefficient values are obtained in 402 from, for example, a user of a computer system implementing the logic of FIG. 4 who manually determines the values, or from a set of objective function coefficient values determined by a previous invocation of the process of the alternate embodiment. In 404, the LP is solved to generate an initial tentative optimal solution. In 406, a set of linear inequalities is initialized to the empty set. Step 408 performs a single pivot of the basis of the tentative optimal solution as determined by the Simplex Algorithm. The pivot is performed in 408 to generate an alternate feasible solution of the LP. Preferably, the pivot is selected to generate an alternate feasible solution that is substantially close to the tentative optimal solution. Hereinafter, this preferable pivot selection technique is referred to simply as selecting a close pivot. For example, the pivot is chosen to minimize the decrease in the total value of the objective function, with respect to the tentative objective function coefficient values. Although selecting a close pivot has advantages that are described below, the alternate embodiment can use other criteria that selects an alternate feasible solution that is not close to the tentative optimal solution (i.e., selecting a remote pivot).

Based on the current set of linear inequalities, inquiry 410 determines if the alternate feasible solution generated in 408 is necessarily not better than the tentative optimal solution. The alternate feasible solution is necessarily not better than the tentative optimal solution if a linear inequality representing the non-negativity of the difference computed by subtracting the alternate feasible solution objective function value from the tentative optimal solution objective function value is redundant with respect to the set of linear inequalities, which is initialized in 406 and updated in 414, as described below. Cone-related mathematical techniques described above can be used to make the determination in 410. If the half-infinite line segment representing the difference between the tentative optimal solution and the alternate feasible solution lies within the cone representing the current set of linear inequalities, then the alternate feasible solution is necessarily not better than the tentative optimal solution, there is no need to obtain a user preference regarding these two solutions, and the process of FIG. 4 continues with 422, as described below. Otherwise, if the alternate feasible solution is possibly superior to the tentative optimal solution (i.e., the half-infinite line segment described above lies outside the current cone), a preference between the tentative optimal solution and the alternate feasible solution is determined in 412 by, for example, querying a user interested in the outcome of the optimization problem being solved.

Generating, in 408, an alternate feasible solution that is substantially close to the tentative optimal solution facilitates the formulation of queries to elicit user preferences in step 412 by allowing the queries to be easier to answer and more pertinent to the knowledge of the user (e.g., the user's business knowledge related to the optimization problem of the LP). Selecting close pivots in 408 also reduces the number of queries that are required in 412 because additional queries for remote pivots are not presented to the user. Reducing the number of queries facilitates the efficient utilization of the user's available time. As one example, a preference in 412 can be determined by asking a user whether it is preferable to have two customers each receiving a shipment a day late, or one customer receiving a shipment three days late and the other customer receiving a shipment on time. The alternate embodiment of FIG. 4 advantageously utilizes these kinds of queries, which can be answered based on the business acumen of users, to facilitate the generation of precise objective function coefficients, while avoiding requesting a user to directly provide a value for a coefficient.

In 414, the preference determined in 412 is expressed as a linear inequality over the space of objective function coefficients, which is added to the current set of linear inequalities. If inquiry 416 determines that the tentative optimal solution is preferred over the alternate feasible solution, a portion of the process described above repeats, beginning at step 408. If inquiry 416 determines that the tentative optimal solution is not preferred (i.e., the alternate feasible solution is preferred over the tentative optimal solution), then 418 recalculates the tentative objective function coefficient values to make the alternate feasible solution the new tentative optimal solution, and to satisfy or maintain consistency with the current set of linear inequalities (i.e., the recalculated objective function coefficient values lie inside the current cone). The recalculation of 418 can be performed by, for example, an orthogonal projection of the previous tentative objective function coefficient values. A preference of the alternate feasible solution over the tentative optimal solution is determined if the alternate feasible solution satisfies criteria specified by, for example, a user of a computer system implementing the calibration process of FIG. 4. In 420, an updated LP is re-solved so that the alternate feasible solution is the current tentative optimal solution. Following step 420, a portion of the process described above repeats starting at 408.

Returning to inquiry 410, if the alternate feasible solution is necessarily inferior to the tentative optimal solution, inquiry 422 checks to determine if all possible pivots for the current tentative optimal solution have already been performed. If 422 determines that all possible pivots have not yet been performed, the process continues by repeating a portion of the process beginning at 408, thereby performing another possible pivot and generating another alternate feasible solution to be checked by inquiry 410.

If 422 instead determines that all possible pivots have been performed for the current tentative optimal solution, then the current tentative optimal solution is returned as the final optimal solution of the LP and the tentative objective function coefficients are returned as the final objective function coefficients of the LP. The set of linear inequalities over the space of objective function coefficients includes enough information to determine the final optimal solution being returned in 424. After the final solution and final coefficients are returned, the alternate embodiment process ends at 426.

Under certain conditions, the calibration process of FIG. 4 can be accelerated. For example, if a plurality of preferences determined in 412 include a first subset of one or more preferences that need to be revised at a time in the future, and a second subset of one or more preferences that do not require revising at that time, then the preferences that do not need revising can be used as the starting point for the set of linear inequalities (i.e., the cone) to accelerate the process of FIG. 4. If some preferences depend on specific business conditions that change over a particular time period, then other preferences that do not depend upon those specific business conditions can be used as the starting point for the cone, thereby accelerating the calibration process.

Computing System for Determining Objective Function Coefficients

Figure 5:
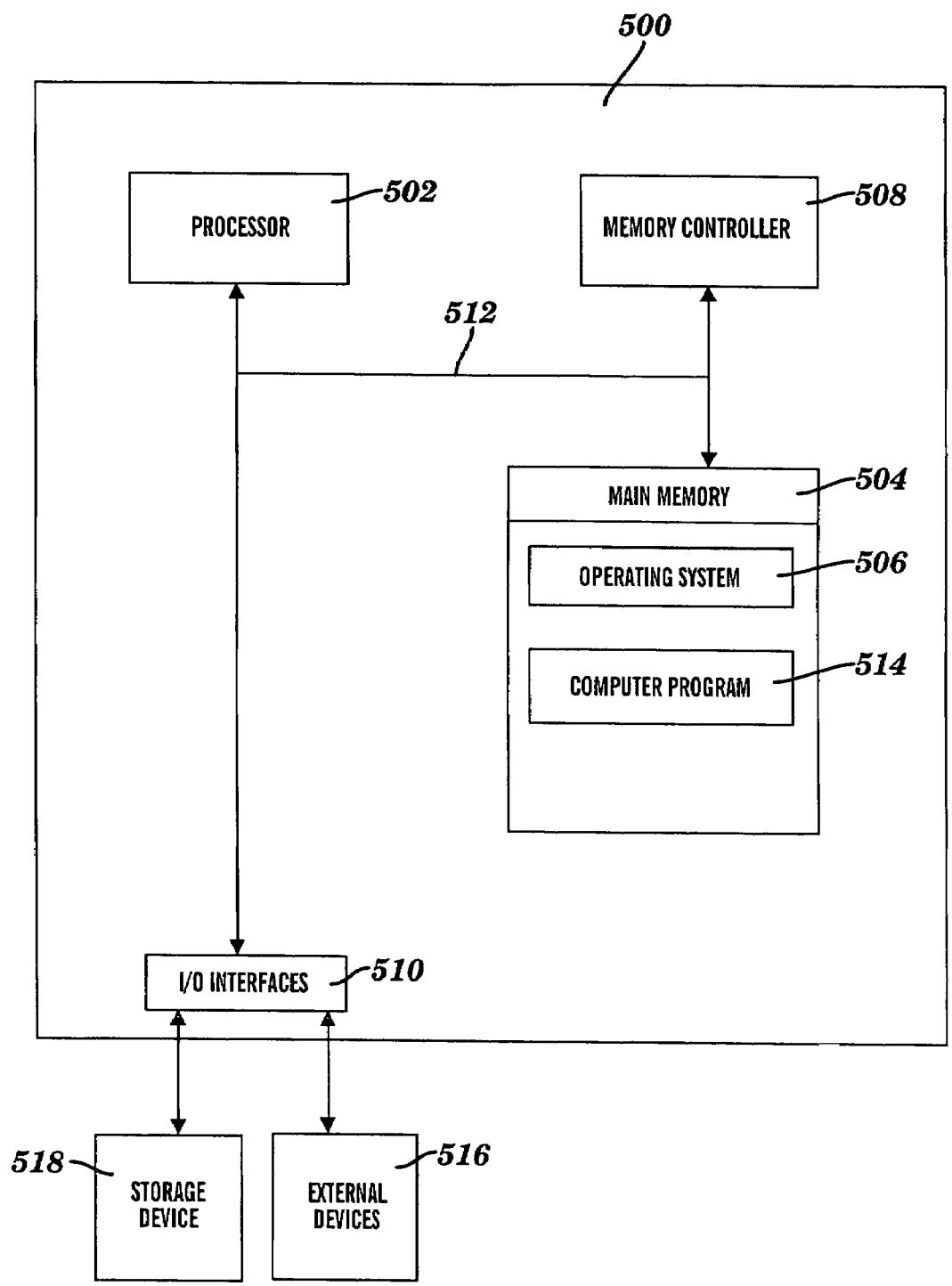
FIG. 5 depicts a computer system for implementing the logic of FIG. 1 and/or FIG. 4, in accordance with embodiments of the present invention.

FIG. 5 depicts a computer system for implementing the method of determining objective function coefficients of FIG. 1 and/or FIG. 4, in accordance with embodiments of the present invention. Computer system 500 suitably comprises a processor 502, a main memory 504, an operating system 506 included in main memory 504, memory controller 508, and at least one input/output (I/O) interface 510. Processor 502, main memory 504, memory controller 508 and I/O interface(s) 510 are interconnected via a system bus 512. Main memory 504 also includes a computer program 514 that includes an algorithm including objective function coefficient determination logic. In one embodiment, computer program 514 includes an algorithm of the logic of FIG. 1. In another embodiment, computer program 514 includes an algorithm of the logic of FIG. 4.

Processor 502 performs computation and control functions of computer system 500, and comprises a suitable central processing unit. Processor 502 may comprise a single integrated circuit, such as a microprocessor, or may comprise any suitable number of integrated circuit devices and/or circuit boards working in cooperation to accomplish the functions of a processor. Processor 502 suitably executes one or more computer programs, including computer program 514, within main memory 504. In one embodiment, processor 502 executes an algorithm implementing the logic depicted in the flow chart of FIG. 1. I/O interfaces 510 may comprise any system for exchanging information from external sources such as external devices 516. External devices 516 may comprise conventional external devices including a display monitor, keyboard, mouse, printer, plotter, facsimile, etc. Computer system 500 can be connected to one or more other computers via a communication interface using an appropriate communication channel (not shown) such as a modem communications path, a computer network, or the like. The computer network (not shown) may include a local area network (LAN), a wide area network (WAN), Intranet, and/or the Internet.

I/O interfaces 510 also allow computer system 500 to store and retrieve information (e.g., program instructions or data) from an auxiliary storage device 518, such as a non-volatile storage device, which can be, for example, a CD-ROM drive which receives a CD-ROM disk (not shown). Computer system 500 can store and retrieve information from other auxiliary storage devices (not shown), which can include a direct access storage device (DASD) (e.g., hard disk or floppy diskette), a magneto-optical disk drive, a tape drive, or a wireless communication device. Memory controller 508, through use of a processor (not shown) separate from processor 502, is responsible for moving requested information from main memory 504 and/or through I/O interfaces 510 to processor 502. While for the purposes of explanation, memory controller 508 is shown as a separate entity, those skilled in the art understand that, in practice, portions of the function provided by memory controller 508 may actually reside in the circuitry associated with processor 502, main memory 504, and/or I/O interfaces 510.

It should be understood that main memory 504 will not necessarily contain all parts of all mechanisms shown. For example, portions of computer program 514 and operating system 506 may be loaded into an instruction cache (not shown) for processor 502 to execute, while other files may well be stored on magnetic or optical disk storage devices, such as storage device 518. In addition, although computer program 514 is shown to reside in the same memory location as operating system 506, it is to be understood that main memory 504 may consist of disparate memory locations.

A terminal interface of I/O interfaces 510 allows system administrators and computer programmers to communicate with computer system 500. Although computer system 500 depicted in FIG. 5 contains only a single main processor 502 and a single system bus 512, it should be understood that the present invention applies equally to computer systems having multiple processors and multiple system buses. Similarly, although system bus 512 is a typical hardwired, multidrop bus, any connection means that supports bi-directional communication in a computer-related environment could be used.

A computer system 500 in accordance with the present invention is, for example, a personal computer. However, those skilled in the art will appreciate that the methods and apparatus of the present invention apply equally to any computer system, regardless of whether the computer system is a complicated multi-user computing apparatus or a single user device such as a workstation.

Note that various modifications, additions, or deletions may be made to computer system 500 illustrated in FIG. 5 within the scope of the present invention such as the addition of cache memory or other peripheral devices. FIG. 5 is presented to simply illustrate some of the salient features of computer system 500.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Thus, the present invention discloses a method for deploying or integrating computing infrastructure, comprising integrating computer-readable code into computer system 500, wherein the code in combination with computer system 500 is capable of performing a process of determining objective function coefficients.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

The above-described steps for implementing the present invention can be programmed in, for example, C or C++. It should be understood by those of ordinary skill in the art, however, that the invention is not limited to the above implementation and is independent of the computer/system architecture. Accordingly, the present invention may equally be implemented on varying computing platforms, programming languages and operating systems, and also may be hardwired into a circuit or other computational component.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Definitions

A production planning linear program, such as the LP described in U.S. Pat. No. 5,971,585, determines decisions including: production starts, material substitutions, and shipments planned to customers, between manufacturing and distribution locations, and from vendor suppliers. A linear program is composed of an objective function that defines a measure of the quality of a given solution, and a set of linear constraints. Examples of the types of constraints used in production planning LP models include:

(1) Material Balance Constraints, which describe the allowable flow of materials through the network of stocking points comprising the supply chain.
(2) Capacity Constraints, which define the amount of capacity available for manufacturing activities.
(3) Inventory Constraints, which define the amount of inventory of a given part or group of parts that can be carried at a particular stocking point.
(4) Backorder Conservation Constraints, which balance the quantity of a given part backordered in a given planning period with the quantity backordered in the previous planning period and the net of new demand and new shipments.
(5) Sourcing Constraints, which define target ranges (minimum and maximum) of shipments that should be made from a particular manufacturing location in the supply chain.
(6) Lotsizing Constraints, which define a discrete set of quantities that a manufacturing production start may take.

LP Formulation

The entire LP formulation is provided below in a form familiar to those practiced in the art, and includes definitions of subscripts, objective function coefficients, constants, and decision variables, as well as LP equations.

Definition of Subscripts j—time period
m—material (part number)
a—plant location within the enterprise
n—material being substituted
z—group (which represents a family or collection of part numbers)
e—process (a method of purchasing or manufacturing a material at a plant)
v—receiving plant location
k—demand center (i.e., customer location) (Note: the set of customer locations is mutually exclusive from the set of plant locations)
q—demand class which indicates relative priority
w—resource capacity which could be a machine, labor hour, or other constraint
u—represents a consumer location which refers to an internal plant, external demand center, or to a generic indicator meaning any plant/or demand center Definition of Objective Function Coefficients $PRC_{jmae}$—cost of releasing one piece of part m during period j at plant a using process e $SUBC_{jmna}$—substitution cost per piece of part number n which is being substituted by part number m during period j at plant a $TC_{jmav}$—transportation cost per piece of part number m leaving plant a during period j which are destined for plant v $INVC_{jma}$—inventory cost of holding one piece of part number m at the end of period j at a particular plant a $DMAXC_{jzau}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $SUB2C_{jmnak}$—substitution cost per piece of part number n which is being substituted by part number m during period j for shipments from plant a to satisfy demand at customer location k $BOC_{jmkq}$—backorder cost of one piece of part m at the end of period j for class q demand at customer location k Definition of Constants $DEMAND_{jmkq}$—demand requested during time period j for part number m at customer location k for demand class q $RECEIPT_{jma}$—quantity of projected wip and purchase order receipts for part number m expected to be received at plant a during time period j $CAPACITY_{jaw}$—capacity of resource w available at plant a during period j to support production starts $CAPREQ_{jmaew}$—capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—cycle time: the number of periods between the release and completion of part m jobs for releases made using process e at plant a during time period j $TT_{mav}$—transport time for part number m from plant a to plant v Definition of LP Decision Variables $I_{jma}$—Inventory at the end of period j for part number m at a particular plant a $P_{jmae}$—Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k $H_{jzu}$—Total shipments of group z (z is a "collection" of parts) leaving suppliers during period j to support consumption at consuming location(s) u $S_{jzau}$—Amount by which total shipments of parts in z from plant a to consuming location(s) u during period j exceeds the maximum amount specified as desired in the sourcing rules $G_{jzau}$—Amount by which total shipments of group z parts from plant a to consuming location(s) u during period j falls short of the minimum amount specified as desired in the sourcing rules $Y_{jmnakq}$—Quantity of part number n which is being substituted by part number m during period j for shipments from plant a to satisfy class q demand at customer location k LP Equations Objective Function:

Minimize:

$$\sum_j\sum_m\sum_a\sum_e PRC_{jmae}P_{jmae} + \sum_j\sum_m\sum_n\sum_a SUBC_{jmna}L_{jmna} +$$

$$\sum_j\sum_m\sum_a\sum_v TC_{jmav}T_{jmav} + \sum_j\sum_m\sum_a INVC_{jma}I_{jma} +$$

$$\sum_j\sum_z\sum_a\sum_u DMAXC_{jzau}S_{jzau} + \sum_j\sum_z\sum_a\sum_u DMINC_{jzau}G_{jzau} +$$

$$\sum_j\sum_m\sum_n\sum_a\sum_q\sum_k SUB2C_{jmnak}Y_{jmnaqk} + \sum_j\sum_m\sum_k\sum_q BOC_{jmkq}B_{jmkq}$$

Subject to:

Sourcing Constraints $$H_{jzu} = \sum_{\substack{m \\ \varepsilon z}}\sum_a \left(T_{jmau} + \sum_q F_{jmauq}\right)$$

$$\sum_{\substack{m \\ \varepsilon z}} \left(T_{jmau} + \sum_q F_{jmauq}\right) - S_{jzau} \leq MAXPCT_{jzau}H_{jzu}$$

$$\sum_{\substack{m \\ \varepsilon z}} \left(T_{jmau} + \sum_q F_{jmauq}\right) + G_{jzau} \geq MINPCT_{jzau}H_{jzu}$$

Capacity Constraints $$\sum_m\sum_e CAPREQ_{jmaew}P_{jmae} \leq CAPACITY_{jaw}$$

Backorder Constraints:

$$B_{jmkq} = B_{(j-1)mkq} + DEMAND_{jmkq} - \sum_n\sum_a Y_{jnmaqk} - \sum_a F_{jmakq}$$

Material Balance Constraints:

$$I_{jma} = I_{(j-1)ma} + RECEIPT_{jma} + \sum_{\substack{x \neq i, t \\ x+CTxmae=j}}\sum_e YIELD_{xmae} * P_{xmae} +$$

-continued $$\sum_n L_{jmna} + \sum_{\substack{xs,t \\ x+TTmav=j}} \sum_v T_{xmva} - \sum_n SUBQTY_{jmna} * L_{jmna} - \sum_v T_{jmav} -$$

$$\sum_k \sum_q F_{jmakq} - \sum_n \sum_k \sum_q Y_{jmnakq} - \sum_{\substack{nst,m \\ \text{is a} \\ \text{component} \\ \text{of } n}} \sum_e QTYPER_{jmaen} P_{jnae}$$

Non-Negativity Constraints

All $X_{i,j\ldots} \geq 0$, where X is a generic decision variable and i, j etc. represent generic subscripts.

What is claimed is:

1. A method of determining a plurality of coefficients of an objective function of a mathematical programming model in a computing environment, said method comprising:
   identifying a plurality of attributes of said model, wherein said plurality of attributes contributes to a goal, wherein said goal is a determination of said plurality of coefficients of said objective function, wherein said goal is included in a top level of a hierarchy having a structure specified by the Analytic Hierarchy Process (AHP), wherein said plurality of attributes is included in a second level of said hierarchy, and wherein said second level is subordinate to said top level in said hierarchy;
   determining a first set of objective function coefficient values as initially representing said plurality of coefficients of said objective function, wherein said first set of objective function coefficient values specifies a first solution of said model;
   initializing a prevailing solution to said first solution, wherein said first set of objective function coefficient values determines said prevailing solution;
   generating multiple sets of objective function coefficient values determining corresponding multiple solutions of said model in addition to said prevailing solution, wherein said generating multiple sets of objective function coefficient values includes sampling a sample space based on said prevailing solution, wherein said multiple solutions are included in a bottom level of said hierarchy, wherein said bottom level is subordinate to said second level, and wherein said hierarchy relates each attribute of said plurality of attributes to said multiple solutions;
   executing the AHP by a computing system, wherein said executing the AHP includes evaluating said multiple solutions to provide a ranking of said multiple solutions, wherein said ranking of said multiple solutions is dependent upon a pair-wise comparison of said plurality of attributes across said second level of said hierarchy and a plurality of pair-wise comparisons of said multiple solutions across said bottom level of said hierarchy;
   selecting a second solution of said multiple solutions, wherein said selecting is based on said ranking of said multiple solutions, wherein said second solution is specified by a second set of objective function coefficients;
   determining that said second solution exceeds a sum of said prevailing solution and a specified tolerance;
   setting said prevailing solution to said second solution in response to said determining that said second solution exceeds said sum;
   setting said first set of objective function coefficient values to said second set of objective function coefficient values in response to said determining that said second solution exceeds said sum;
   subsequent to said determining that said second solution exceeds said sum, said setting said prevailing solution, and said setting said first set of objective function coefficient values, repeating said generating, said executing the AHP, said selecting said second solution, said setting said prevailing solution, and said setting said first set of objective function coefficient values until said second solution does not exceed said sum;
   determining, subsequent to said repeating, that said plurality of coefficients of said objective function is said first set of objective function coefficient values; and
   storing, by said computing system and subsequent to said repeating, said first set of objective function coefficient values in a data storage device of said computing environment.

2. The method of claim 1, further comprising:
   inserting said goal in a node at said top level of said hierarchy having said structure specified by the AHP;
   inserting said plurality of attributes in a plurality of nodes at said second level of said hierarchy; and
   inserting said multiple solutions in each set of multiple nodes of a plurality of sets of multiple nodes, wherein said hierarchy associates said sets of multiple nodes of said plurality of sets of multiple nodes to said nodes of said plurality of nodes in a one-to-one correspondence.

3. The method of claim 1, wherein said evaluating said multiple solutions includes:
   pair-wise comparing, across said second level of said hierarchy, said attributes included in said plurality of attributes;
   determining, in response to said pair-wise comparing said attributes, a first plurality of weights, wherein a weight of said first plurality of weights indicates, in relation to achieving said goal, a degree of importance of one attribute of said plurality of attributes over another attribute of said plurality of attributes,
   pair-wise comparing said multiple solutions for each attribute of said plurality of attributes; and
   determining, in response to said pair-wise comparing said multiple solutions, a second plurality of weights, wherein a weight of said second plurality of weights indicates, in relation to satisfying an attribute of said plurality of attributes, a degree of importance of one solution of said multiple solutions over another solution of said multiple solutions.

4. The method of claim 3, wherein each weight of said first plurality of weights is independent of a value resulting from said objective function, and wherein each weight of said second plurality of weights is independent of said value resulting from said objective function.

5. The method of claim 1, further comprising:
   identifying, for each coefficient of said plurality of coefficients, a type of a plurality of types;
   determining a first set of rules that order said plurality of types;
   determining a second set of rules, each rule of said second set indicating a preference of a first coefficient of said plurality of coefficients over a second coefficient of said plurality of coefficients, wherein said first coefficient and said second coefficient are associated with a single type of said plurality of types; and
   representing each coefficient of said plurality of coefficients as a sum of a first parameter of a first plurality of parameters dependent upon said first set of rules and a second parameter of a second plurality of parameters dependent upon said second set of rules.

6. The method of claim 5, further comprising:

setting, prior to said generating said multiple sets of objective function coefficient values, said first plurality of parameters to a first plurality of initial values based on a result of said determining said first set of objective function coefficient values, wherein said generating said multiple sets of objective function coefficient values includes updating said first plurality of parameters to a plurality of updated values;

setting, prior to said generating said multiple sets of objective function coefficient values, said second plurality of parameters to a second plurality of initial values based on said result of said determining said first set of objective function coefficient values; and maintaining said second plurality of parameters as said second plurality of initial values during said generating said multiple sets of objective function coefficient values and thereafter.

7. The method of claim 5, further comprising modifying, in response to said evaluating, a set of rules selected from the group consisting of said first set of rules and said second set of rules.

8. A computing system comprising a processor coupled to a computer-readable memory unit, said memory unit comprising a software application, said software application comprising instructions that when executed by said processor implement the method of claim 1.

9. A computer program product, comprising a computer-usable medium having a computer-readable program code stored therein, wherein said computer-usable medium is a recordable type medium, said computer-readable program code comprising an algorithm adapted to implement the method of claim 1.

10. A process for deploying computing infrastructure, comprising integrating computer-readable code into a computing system, wherein the code in combination with the computing system is capable of performing a method of determining a plurality of coefficients of an objective function of a mathematical programming model in a computing environment, said method comprising:

identifying a plurality of attributes of said model, wherein said plurality of attributes contributes to a goal, wherein said goal is a determination of said plurality of coefficients of said objective function, wherein said goal is included in a top level of a hierarchy having a structure specified by the Analytic Hierarchy Process (AHP), wherein said plurality of attributes is included in a second level of said hierarchy, and wherein said second level is subordinate to said top level in said hierarchy;

determining a first set of objective function coefficient values as initially representing said plurality of coefficients of said objective function, wherein said first set of objective function coefficient values specifies a first solution of said model;

initializing a prevailing solution to said first solution, wherein said first set of objective function coefficient values determines said prevailing solution;

generating multiple sets of objective function coefficient values determining corresponding multiple solutions of said model in addition to said prevailing solution, wherein said generating multiple sets of objective function coefficient values includes sampling a sample space based on said prevailing solution, wherein said multiple solutions are included in a bottom level of said hierarchy, wherein said bottom level is subordinate to said second level, and wherein said hierarchy relates each attribute of said plurality of attributes to said multiple solutions;

executing the AHP by a computing system, wherein said executing the AHP includes evaluating said multiple solutions to provide a ranking of said multiple solutions, wherein said ranking of said multiple solutions is dependent upon a pair-wise comparison of said plurality of attributes across said second level of said hierarchy and a plurality of pair-wise comparisons of said multiple solutions across said bottom level of said hierarchy;

selecting a second solution of said multiple solutions, wherein said selecting is based on said ranking of said multiple solutions, wherein said second solution is specified by a second set of objective function coefficients;

determining that said second solution exceeds a sum of said prevailing solution and a specified tolerance;

setting said prevailing solution to said second solution in response to said determining that said second solution exceeds said sum;

setting said first set of objective function coefficient values to said second set of objective function coefficient values in response to said determining that said second solution exceeds said sum;

subsequent to said determining that said second solution exceeds said sum, said setting said prevailing solution, and said setting said first set of objective function coefficient values, repeating said generating, said executing the AHP, said selecting said second solution, said setting said prevailing solution, and said setting said first set of objective function coefficient values until said second solution does not exceed said sum;

determining, subsequent to said repeating, that said plurality of coefficients of said objective function is said first set of objective function coefficient values; and storing, by said computing system and subsequent to said repeating, said first set of objective function coefficient values in a data storage device of said computing environment.

11. The process of claim 10, wherein said method further comprises:

inserting said goal in a node at said top level of said hierarchy having said structure specified by the AHP;

inserting said plurality of attributes in a plurality of nodes at said second level of said hierarchy; and inserting said multiple solutions in each set of multiple nodes of a plurality of sets of multiple nodes, wherein said hierarchy associates said sets of multiple nodes of said plurality of sets of multiple nodes to said nodes of said plurality of nodes in a one-to-one correspondence.

12. The process of claim 10, wherein said evaluating said multiple solutions includes:

pair-wise comparing, across said second level of said hierarchy, said attributes included in said plurality of attributes;

determining, in response to said pair-wise comparing said attributes, a first plurality of weights, wherein a weight of said first plurality of weights indicates, in relation to achieving said goal, a degree of importance of one attribute of said plurality of attributes over another attribute of said plurality of attributes, pair-wise comparing said multiple solutions for each attribute of said plurality of attributes; and determining, in response to said pair-wise comparing said multiple solutions, a second plurality of weights, wherein a weight of said second plurality of weights indicates, in relation to satisfying an attribute of said plurality of attributes, a degree of importance of one solution of said multiple solutions over another solution of said multiple solutions.

13. The process of claim 12, wherein each weight of said first plurality of weights is independent of a value resulting from said objective function, and wherein each weight of said second plurality of weights is independent of said value resulting from said objective function.

14. The process of claim 10, wherein said method further comprises:
   identifying, for each coefficient of said plurality of coefficients, a type of a plurality of types;
   determining a first set of rules that order said plurality of types;
   determining a second set of rules, each rule of said second set indicating a preference of a first coefficient of said plurality of coefficients over a second coefficient of said plurality of coefficients, wherein said first coefficient and said second coefficient are associated with a single type of said plurality of types; and
   representing each coefficient of said plurality of coefficients as a sum of a first parameter of a first plurality of parameters dependent upon said first set of rules and a second parameter of a second plurality of parameters dependent upon said second set of rules.

15. The process of claim 14, wherein said method further comprises:
   setting, prior to said generating said multiple sets of objective function coefficient values, said first plurality of parameters to a first plurality of initial values based on a result of said determining said first set of objective function coefficient values,
   wherein said generating said multiple sets of objective function coefficient values includes updating said first plurality of parameters to a plurality of updated values;
   setting, prior to said generating said multiple sets of objective function coefficient values, said second plurality of parameters to a second plurality of initial values based on said result of said determining said first set of objective function coefficient values; and
   maintaining said second plurality of parameters as said second plurality of initial values during said generating said multiple sets of objective function coefficient values and thereafter.

16. The process of claim 14, further comprising modifying, in response to said evaluating, a set of rules selected from the group consisting of said first set of rules and said second set of rules.

17. A computer-implemented method of determining a plurality of coefficients of an objective function of a mathematical programming model, said method comprising:
   receiving, by a computing system, a goal, a plurality of decision-making criteria, and a prevailing solution of said mathematical programming model, wherein said goal is a determination of said plurality of coefficients of said objective function, wherein said plurality of decision-making criteria contributes to said goal, wherein said goal and said plurality of decision-making criteria are required by the Analytic Hierarchy Process (AHP), and wherein said prevailing solution is specified by a first set of objective function coefficient values;
   generating, by said computing system, multiple sets of objective function coefficient values that specify, in a one-to-one correspondence, multiple solutions of said mathematical programming model, wherein said multiple solutions are based on said prevailing solution, and wherein said plurality of decision-making criteria relate each solution of said multiple solutions to said goal according to the AHP;
   generating an AHP hierarchy as a hierarchical structure specified by the AHP, wherein said AHP hierarchy includes at least three levels, wherein said three levels includes a top level, a second level subordinate to said top level, and bottom level subordinate to said second level, wherein said top level includes said goal, wherein said second level includes said plurality of decision-making criteria, wherein said bottom level includes said multiple solutions, and wherein said AHP hierarchy relates each decision-making criterion of said plurality of decision-making criteria to said multiple solutions;
   executing the AHP by said computing system, wherein said executing the AHP includes evaluating said multiple solutions, wherein said evaluating includes:
      pair-wise comparing, across said second level of said AHP hierarchy, said decision-making criteria included in said plurality of decision-making criteria;
      determining, in response to said pair-wise comparing said decision-making criteria, a first plurality of weights, wherein a weight of said first plurality of weights indicates, in relation to achieving said goal, a degree of importance of one decision-making criterion of said plurality of decision-making criteria over another decision-making criterion of said plurality of decision-making criteria, and wherein each weight of said first plurality of weights is independent of a value resulting from said objective function;
      pair-wise comparing said multiple solutions across said bottom level of said AHP hierarchy for each decision-making criterion of said plurality of decision-making criteria;
      determining, in response to said pair-wise comparing said multiple solutions, a second plurality of weights, wherein a weight of said second plurality of weights indicates, in relation to satisfying a decision-making criterion of said plurality of decision-making criteria, a degree of importance of one solution of said multiple solutions over another solution of said multiple solutions, and wherein each weight of said second plurality of weights is independent of said value resulting from said objective function;
      determining, subsequent to said determining said first plurality of weights and said determining said second plurality of weights, a plurality of aggregate values based on an execution of the AHP operating on said first plurality of weights and said second plurality of weights,
      determining, subsequent to said determining said plurality of aggregate values, multiple rankings of said multiple solutions based on said aggregate values; and
      selecting, subsequent to said determining said multiple rankings, a second solution of said mathematical programming model, wherein said second solution is included in said multiple solutions, wherein said second solution is specified by a second set of objective function coefficient values, and wherein said second solution has a ranking of said multiple rankings that indicates a superiority of said second solution over any other solution of said multiple solutions;
   determining, by said computing system, that said second solution exceeds a sum of said prevailing solution and a specified tolerance;

setting, by said computing system and in response to said determining that said second solution exceeds said sum, said prevailing solution to said second solution;

setting, by said computing system and in response to said determining that said second solution exceeds said sum, said first set of objective function coefficient values to said second set of objective function coefficient values;

repeating, by said computing system, said generating multiple sets of objective function coefficient values, said evaluating, said setting said prevailing solution, and said setting said first set of objective function coefficient values until said second solution does not exceed said sum;

determining, by said computing system and subsequent to said repeating, that said plurality of coefficients of said objective function is said first set of objective function coefficient values; and storing, by said computing system and subsequent to said repeating, said first set of objective function coefficient values in a data storage device.

18. A computer-implemented method of determining objective function coefficient values of a linear programming (LP) model, said method comprising:

generating, by a computing system, a first set of tentative objective function coefficient values of a plurality of objective function coefficients of said LP model, a tentative optimal solution of said LP model, and a set of linear inequalities over a space of said plurality of objective function coefficients, wherein said tentative optimal solution is based on said first set of tentative objective function coefficient values;

performing, via a first execution of the Simplex Algorithm by said computing system and subsequent to said generating said tentative optimal solution, a first pivot, wherein said performing said first pivot includes pivoting a basis of said tentative optimal solution, and wherein a result of said performing said first pivot is a first alternate feasible solution of said LP model;

determining, by said computing system and subsequent to said performing said first pivot, a first difference by subtracting an objective function value of said first alternate feasible solution from an objective function value of said tentative optimal solution;

determining, by said computing system and subsequent to said determining said first difference, that a first linear inequality representing a non-negativity of said first difference is not a redundant linear inequality with respect to said set of linear inequalities;

receiving, by said computing system and subsequent to said determining that said first linear inequality is not said redundant linear inequality, a first preference between said tentative optimal solution and said first alternate feasible solution;

inserting, by said computing system and subsequent to said receiving said first preference, a second linear inequality into said set of linear inequalities, wherein said second linear inequality represents said first preference;

determining, by said computing system and subsequent to said inserting said second linear inequality, that said first preference indicates a preference of said tentative optimal solution over said first alternate feasible solution;

repeating said performing said first pivot, said determining said first difference, said determining that said first linear inequality is not said redundant linear inequality, said receiving said first preference, and said inserting said second linear inequality until said first preference indicates a preference of said first alternate feasible solution over said tentative optimal solution;

determining, by said computing system and subsequent to said repeating, that said first preference indicates a preference of said first alternate feasible solution over said tentative optimal solution;

updating, by said computing system and in response to said determining that said first preference indicates said preference of said first alternate feasible solution over said tentative optimal solution, said first set of tentative objective function coefficient values to generate a second set of tentative objective function coefficient values and to make said first alternate feasible solution optimal, wherein said second set of tentative objective function coefficient values maintains a consistency with said set of linear inequalities;

setting, by said computing system and in response to said determining that said first preference indicates said preference of said first alternate feasible solution over said tentative optimal solution, said tentative optimal solution as said first alternate feasible solution;

performing, via a second execution of the Simplex Algorithm by said computing system and subsequent to said setting said tentative optimal solution as said first alternate feasible solution, a second pivot, wherein said performing said second pivot includes pivoting a basis of said tentative optimal solution, and wherein a result of said performing said second pivot is a second alternate feasible solution of said LP model;

determining, subsequent to said performing said second pivot, based on an analysis of said set of linear inequalities and not based on a user-determined preference between said second alternate feasible solution and said tentative optimal solution, that said second alternate feasible solution is necessarily not superior to said tentative optimal solution; and determining, by said computing system and subsequent to said performing said second pivot, that no other pivots of a plurality of pivots are unperformed, wherein said plurality of pivots is associated with said tentative optimal solution;

identifying, by said computing system and subsequent to said determining that no other pivots of said plurality of pivots are unperformed, said second set of tentative objective function coefficient values as a final set of objective function coefficient values of a final optimal solution of said LP model; and storing, by said computing system and subsequent to said identifying, said final set of objective function coefficient values in a data storage device coupled to said computing system.

19. The method of claim 18, wherein said determining that said second alternate feasible solution is necessarily not superior to said tentative optimal solution includes:

determining a second difference by subtracting an objective function value of said second alternate feasible solution from an objective function value of said tentative optimal solution; and determining, subsequent to said determining said second difference, that a linear inequality representing a non-negativity of said second difference is a second redundant linear inequality with respect to said set of linear inequalities.

20. The method of claim 19, wherein said determining that said second alternate feasible solution is necessarily not superior to said tentative optimal solution includes determining that a half infinite line segment representing said second difference lies within an N-dimensional cone, wherein said plurality of objective function coefficients includes N objective function coefficients, and wherein said set of linear inequalities describes said N-dimensional cone in said space of said plurality of objective function coefficients.

* * * * *